United States Patent [19]

Ellis

[11] 3,923,697

[45] Dec. 2, 1975

[54] ELECTRICALLY CONDUCTIVE COMPOSITIONS AND THEIR USE

[76] Inventor: Harold Ellis, P.O. Box 2158, Ocean View Branch, Miami Beach, Fla. 33140

[22] Filed: Feb. 1, 1974

[21] Appl. No.: 438,824

[52] U.S. Cl.............. 252/506; 106/56; 106/193 R; 106/241; 106/286; 106/287 S; 106/288 B; 106/288 Q; 106/296; 106/307; 252/502; 252/510; 252/511; 260/37 EP; 260/37 N; 260/37 R; 260/37 SB; 260/38; 260/40; 260/42.43; 260/42.46; 260/42.48; 260/42.49; 260/42.51; 260/42.52
[51] Int. Cl.² ........................................... H01B 1/06
[58] Field of Search .......... 252/506, 511, 502, 510; 106/296, 307

[56] References Cited
UNITED STATES PATENTS

| | | | |
|---|---|---|---|
| 1,947,692 | 2/1934 | Beyer | 252/506 X |
| 3,342,752 | 9/1967 | Wada | 252/511 |
| 3,578,577 | 5/1971 | Gilchrist | 252/511 X |

*Primary Examiner*—Benjamin R. Padgett
*Assistant Examiner*—E. Suzanne Parr
*Attorney, Agent, or Firm*—Browne, Beveridge, DeGrandi & Kline

[57] ABSTRACT

An electrically conductive composition comprises a particulate, homogeneous blend of:

A. about 60% to about 98% by weight of graphite;

B. about 1.5% to about 20% by weight of manganese dioxide; and

C. about 0.5% to about 20% by weight of zinc oxide, based on total weight of said blend. These compositions are suitable for the manufacture of coating compositions, heating elements and structures which are useful where radiant, conductive, or convective heating is required, and for other applications which utilize the sheet and volumetric electrical conductivity properties of the formulations made therefrom.

12 Claims, No Drawings

ELECTRICALLY CONDUCTIVE COMPOSITIONS AND THEIR USE

The present invention relates to a family of infra-red radiating compositions having unique properties, and with a wide variety of utilitarian applications, along with the process of producing and using the same.

The compositions are electrically conductive, and when connected to appropriate electrical power sources, either alternating current (AC) or direct current (DC), convert electricity and produce electromagnetic oscillations falling within the infra-red region of the electromagnetic spectrum. The radiation from the conversion of the consumed electrical energy, when intercepted by and falling upon objects of any nature, is converted into sensible heat, and thus warms by radiation. The particulate compositions and coatings themselves, at the same time, become warm to hot, and by convection heat the air, gases, fluids, and solids of any nature in the vicinity of the coatings, as well as heating by conduction the substrates on which the coatings are applied as well as the back supporting structures.

The formulation of electrically conductive coatings is well established in art and practice. In this prior art, a wide variety of free base metals, such as zinc, lead, nickel, aluminum, copper and a variety of alloys and the like; as well as precious metals such as silver, gold, palladium and the like; metallic salts; alkaline earth metals; elemental carbon, such as carbon black or graphite, as well as metallic wires and carbon filaments have been used alone and in combination in finely divided form or as filaments, wire, rod, roving and braids in film and sheet form; and incorporated in various concentrations in matrices which form thin and thick films, coatings, paints, adhesives, sealants and potting mastices. The processes for producing these electrically conductive coatings as well as their application in radiant, convective and conductive heating elements, in electrostatic discharge and in electrical conduction, is similarly well established in art and practice and covered by numerous U.S. and foreign patents. To cite one example, in U.S. Pat. No. 3,099,587 Hunter discloses formulations for electrically conductive coatings to be applied to non-conducting surfaces, consisting of a mixture of C, Ag, and Fe in varying percentages incorporated in a thermosetting resin.

Similarly, the art and practice of heat-producing thermogenic coatings has been disclosed in British Patent 1,296,855 issued Nov. 22, 1972 to J. A. Saunders. This patent discloses an aqueous mixture of graphite and conductive carbon black in potassium silicate and lithium silicate - sodium silicate solutions along with appropriate wetting agents. The same pigment mix was shown to function in solvent-based coatings cast from a variety of thermosetting and thermoplastic resins. Application has been made for a U.S. Pat., filed Apr. 13, 1970 (Ser. No. 28,154).

However, the performance of coatings described in the literature leaves much to be desired. For reasons cited herein below the heat output is difficult to control, and heat producing coatings or paints show great variation in their day-to-day performance. Metals in powder form oxidize and form oxides and other compounds on their surfaces. These metallic oxides are non-conductors and impede the passage of electric current. Additionally, all the metals have positive thermal coefficients of resistance, i.e., with increase in temperature their resistance increases, and their conductivity decreases. Elemental carbon, especially in the graphitized form, has a negative thermal coefficient of resistance, and with increase in temperature, resistance decreases and conductivity increases. Thus, the dispersions of these materials frequently fail to provide the conductive stability required for successful commercial application. The cited British Patent requires the use of a large and expensive transformer to control the voltage when the paint is used for radiant heating in homes, thus adding greatly to the cost of installation. Last, but not least, the above-mentioned precious metals are expensive, and the resulting costs of compositions made therefrom severely limit their areas of application.

Accordingly, this invention provides a electrically conductive particulate composition and an electrically conductive coating composition which contain a balanced mixture of conductive, resistive, and stabilizing ingredients, thus reducing the inherently high dielectric resistance of coating vehicles employed therewith.

The electrically conductive particulate composition of this invention comprises a particulate, homogeneous blend of (A) about 60 to about 98% by weight of graphite, (B) about 1.5% to about 20% by weight of manganese dioxide, and (C) about 0.5% to about 20% by weight of zinc oxide, each of these percentages based on the total weight of the particulate blend.

This invention also provides a coated substrate having thereon a layer of substantially uniform thickness, wherein the layer comprises the electrically conductive particulate, homogeneous blend of this invention.

This invention further provides a device for radiant, conductive or convective heating, or combinations of these heating means. The device comprises the substrate coated with the particulate, homogeneous blend of this invention, and at least two electrodes in contact with the particulate blend for the passage of electric current.

The electrically conductive coating composition of this invention comprises the electrically conductive particulate blend of this invention uniformly dispersed in a vehicle. The vehicle preferably comprises a binder, and optionally a solvent for the binder. A further coating composition of this invention comprises the particulate, homogeneous blend of this invention and a solid, particulate binder.

Additionally, this invention provides a substrate having a layer thereon of substantially uniform thickness, wherein the layer comprises either of the electrically conductive coating compositions of this invention.

This invention also provides a device for radiant, conductive, or convective heating, or combinations of these heating modes, wherein the device comprises the substrate of this invention coated with either of the coating compositions of this invention, and at least two electrodes in contact with said compositions for the passage of electric current.

Further, this invention provides an improved process for the preparation of a coating composition comprising a particulate component and a vehicle. The improvement comprises using the electrically conductive particulate blend of this invention as the particulate component, and blending this component with a vehicle to form a homogeneous composition suitable for application to a substrate and capable of being adhered to the substrate, and further in which the coating, when cured, forms an infra-red radiating coating when an electric current is passed therethrough.

This invention further provides a process of heating a solid, liquid, gas or combinations thereof by conduction, convection, radiation or combinations of these means, by applying an electrical potential between at least two of the electrodes contained in the devices of this invention.

This invention also provides a process for manufacturing a heating device by applying to a substrate a layer of uniform thickness, wherein the layer comprises the coating composition of this invention which contains the particulate blend and a vehicle, and evaporating volatile components contained in the vehicle.

This invention provides a means for signalling, information transmission and status reporting by utilizing the electromagnetic oscillations of the infrared wavelengths generated; additionally, this invention provides a means of carrying electrical current and providing electrical continuity thereby, thus substituting for other more conventional electrical conduction devices, such as wires, cables, bus bars, etc.

A process for signalling, information transmission and status reporting involves applying an electrical potential between at least two of the electrodes contained in the devices of this invention to thereby generate infrared radiation, and then sensing this radiation. Infrared radiation sensors are well known in the art. The output from the sensor, usually in form of an electrical signal, can be employed to activate, deactivate or control an electrical or mechanical device.

Electrically conductive coatings of this invention can be impervious to moisture and resistant to shock.

One feature of the present invention resides in the incorporation of a stabilizing ingredient into an electrically conductive composition. Surprisingly, I have now found that resistive metallic oxides in the formulation counterbalance the negative thermal coefficient of resistance of a graphite composition, so that the resulting formulation is neutral (i.e. a thermal coefficient of electrical conductivity of 1) and stable (that is, the formulation shows substantially no increase or decrease in resistance with charges of temperature, thus, a TCR of about zero). Moreover, the overall resistance in ohms per square of compositions of this invention does not change with changes in temperature, nor with varying voltage, nor change with time. Coating compositions, thus, show no "start-up" amperage or current surges. In addition, they have been shown to be conductively stable with time. Also, compositions of this invention emit infra-red radiation with an emissivity close to that of a "black body" (0.968 to 0.988), thus converting the consumed electricity into radiant and convective heat with an efficiency 100% over that of resistive heating wires. Radiation efficiency of the formulations disclosed herein has been calculated to be 98 to 99% compared to metal-sheath infra-red heaters having efficiencies of 56%, quartz-tubes of 62%, T-3 type and tungsten filament quartz lamps of 86%, and resistive wire and coils of 50%.

The compositions disclosed herein are stable, inert (i.e. they do not react with most atmospheres and substrates with which they are generally employed), consistent, reproducible, usable over a wide range of voltages; and, after curing the binder in which the conductive-resistive ingredients can be embedded, changes in voltage and temperature have substantially no effect on the resistance of the coatings, expressed in ohms.

The coating composition of this invention comprises a two-phase system: (a) liquid vehicle, and (b) conductive-resistive composition, commonly termed the "pigment." The pigment comprises the particulate, homogeneous blend of graphite, $MnO_2$ and ZnO of this invention.

The conductive-resistive filler (pigment) composition comprises an intimate physical mixture of different-sized graphite crystallites, manganese dioxide ($MnO_2$) and zinc oxide (ZnO). Each element of the mixture contributes to the overall success. The graphite particles, with their negative thermal coefficient of resistance (TCR), constitutes the major conductive component in carrying the electrical current between the conducting electrodes of the circuit. The manganese dioxide supplies the resistive component and the counter-balancing positive thermal coefficient of resistance which permits the resistance of the formulation to be substantially insensitive to thermal and potential (voltage) changes. The zinc oxide in the formulation is a semi-conductor electron "donor" and aids the current flow. It also serves as a stabilizer in the vehicle system, a strengthening filler, and imparts fire retardancy to resins which may be employed, and, where silicates are employed as a film-former, insolubilizes the silicate film. The metallic oxides supply controllable resistance so that heat and infra-red radiation are generated upon the application of an electrical current potential.

A preferred electrically conductive, particulate blend of this invention comprises:

A. about 88 to about 94 weight percent graphite,
B. about 4 to about 8 weight percent manganese dioxide, and
C. about 0.7 to about 3 weight percent zinc oxide.

The particularly preferred electrically conductive, particulate blend of this invention comprises:

A. about 450 gms. or about 92.6 weight percent of graphite,*
B. about 30 gms. or about 6.2 weight percent of manganese dioxide, and
C. about 6 gms. or about 1.2 weight percent of zinc oxide.

*A preferred graphite is supplied by LONZA, LTD., Switzerland. It consists of about 69.4% of a crystallite having a particle size of about 75 microns and of about 23.2% of a crystallite having a particle size of about 2 microns. It is substantially all lamellar crystallite.

The ratio of the components in the particulate blend of this invention can vary widely within the scope of my invention, which in its broadest sense contemplates about 60 to about 98 weight percent of graphite, about 1.5 to about 20 weight percent of manganese dioxide, and about 0.5 to about 20 weight percent of zinc oxide. However, ratios of about 92.6% graphite, about 6.2% manganese dioxide and about 1.2% zinc oxide are preferred because outstanding results are achieved as described hereinafter.

Within these broad ranges of percentages of the various components in the particulate blend, a person skilled in the art will be able to determine with a minimum of experimentation specific proportions for a given application. Knowing the function of each ingredient aids in this determination. As previously described, the graphite constitutes the major electrically conductive component; the manganese dioxide acts as a resistive component and counter-balances the negative TCR of the graphite; the zinc oxide is a semi-conductor and stabilizer and improves the chemical and physical properties of the particulate blend and coatings in which the blend is employed. Thus, if the proportions of manganese dioxide and zinc oxide are too low, the TCR of the particulate blend will be markedly negative. For example, when a coating composition containing only graphite is employed in the manufacture of a small warming tray (12 inches long × 6 inches wide), the tray exhibits a resistance of 650 ohms at 75°F. The resistance drops, however, to 330 ohms when the tray is heated to 250°F. This corresponds to about a 50% drop in resistance, or −1.8 ohms/°F. The manganese dioxide and zinc oxide can be employed in an amount sufficient to decrease conductivity and neutralizes the negative TCR of the graphite.

On the other hand, if the proportion of graphite is too low and the proportions of the metallic oxides too high, the TCR may be too positive in value and the resistance so high that coatings containing such a particulate blend will not be sufficiently conductive to provide adequate wattage output except at much higher voltages. Thus, for many applications the preferred proportions of components in the particulate blend will be employed.

Nevertheless, there may be instances in which relatively large proportions of manganese dioxide and zinc oxide are advantageous and even necessary. For example, if the binder employed in a coating composition has relatively low surface and volumetric resistivities, the larger proportions of the metallic oxides can be employed to reduce the conductivity of the resulting coating. (Volume resistivity and surface resistivity of a binder can be determined by ASTM D257-61).

In addition, it will be readily apparent to persons skilled in the art that additional conductive agents and electron donors, such as AgCl, SnCl$_4$ and the like may be added. Formulas equally efficient in producing infra-red radiation have been made by incorporating these agents in quantities ranging from about 0.5% to about 5.0% based on total pigment. Depending on the final results desired, with respect to surface temperature and wavelength of infra-red radiation emitted, the aforementioned ratios may be varied as portrayed above.

In order for the components of the conductive-resistive pigment to function optimally, all pigment should be dry. If the moisture is not driven from the particulate components, it may become trapped in the coating and cause voids and bubbles when it is driven off by heating. It may also give the coating a cloudy appearance. In formulations which are air cured, moisture can render the film inoperative. Generally, the pigment components should contain less than about 3 weight percent moisture. However, depending upon the vehicle employed, natural moisture content of up to about 20% can be tolerated. It is to be understood that these moisture levels also apply to the cured coatings.

To attain the desired degree of moisture content, drying of the mix can be carried out at about 105°C for several hours in a hot air oven, or in a microwave oven for an appropriate time.

The graphite can be synthetic or natural. Synthetic graphites manufactured from petroleum coke or anthracite coal have been found preferred to natural graphites, which are more variable in contaminants (especially silicates) and minor constituents, and from most sources do not have as well defined lamellar crystallite structure. The lamellar structure has been found to be associated with the high degree of conductivity of the preferred materials. The synthetic graphites have a higher conductivity than natural graphites even when both have the same degree of carbon content. Synthetic graphites from petroleum coke appear to be more efficient conductors of electricity than those manufactured from coal.

While the particle size of graphite is not critical, there is a direct correlation between mean particle size and conductivity. The larger the crystallite particle size of the graphite crystallite which constitutes the graphite grain, the better the electrical conductivity. Transitional resistance between the powder grains in a fine material is higher than that of a coarse material. It has been discovered that the larger the particle size of the graphite crystallite, the more efficient the conductivity. For similar type formulations, graphite with a particle size of about 250 microns to about 75 microns has a lower resistivity than a powder with a mean particle size of 44 microns, which in turn has a lower resistivity than a powder with a mean particle size of 2 microns to 1 micron. As is well known by those experienced in the science of micromeritics (fine particle measurement), fine powders are not commercially supplied with narrow particle size ranges, but rather as a broad range of particle sizes centering around a mean distribution. It is in this context that the particle sizes of the crystallites in the formulation are described, and consequently, any particle size of about 250 microns to about 1 micron should be acceptable. ("Transitional" refers to the inter-phase barrier between the surface of the graphite crystallite and the surrounding matrix and the proximal graphite crystallite particles. The electrical current which travels very easily within the crystal, has to leave the crystal to enter a much less conductive matrix, then reenter the next particle. The physics of this transition zone, the "squeezing down" of the flux density as the current leaves the particles, explains why lamellar crystallite graphites are superior to other forms, why larger size crystallites are superior conductors to smaller size crystallites, and why graphites are superior to the round carbon black particles.)

Preferably, the graphite should be highly carbonized, with a carbon content of 99.9% or greater, although, depending on the formulation, lower degrees of carbonization will serve. Synthetic graphites are significantly better in conductivity than conductive carbon blacks including acetylene carbon black which depends for its effectiveness on a chain-like adhesion of spherical particles. These carbon blacks are the most commonly used form of carbon in conductive coatings. The graphite particles, preferably, should be lamellar, flat plates, although any shape would be usable. Graphite is highly anisotropic in its electrical conductivity; electron migration along the long axis of the particle is several times greater than the migration in an axis perpendicular to the long axis. Platy crystals are better conductors than irregular-shaped crystals, and the thicker the crystal, the better the conduction. The direction that the particles orient in the film is also important, although not critical. Because of the anisotropy in its electrical conduction, the greater the percentage of crystallites lying parallel to the path of the electrical potential between the electrodes, the lower the overall film resistance.

In passing from grain to grain across the inherent dielectric resistance of the binder, it has been discovered that the overall resistance of films can significantly be reduced, and thus the conductivity increased, by inserting into the spaces between the larger crystallites of graphite smaller-sized particles of lamellar graphite. It has been found that 2 micron mean-size particles intercalate between the larger particles, and act as a "bridge" in the conductivity. When the smaller particles are added in a ratio of between about 1 : 3 to about 1 : 4 with respect to the weight of the larger particles, the smaller particles optimally fill the voids between the larger crystallites. This has been shown both experimentally and mathematically.

Most of the formulations described in U.S. and foreign patents and literature covering the use of graphite and other forms of conductive carbons in conductive coatings specify the use of colloidal or sub-micron or micron sized particles, without specifying that they be crystallites. The present disclosure describes the use of larger sized crystallites, up to a mean size of 200 to 250 microns as more efficient than the sub-micron sized particles.

In addition, it has been found that the higher the pigment loading in a film-forming binder, the lower the resistance and the higher the conductivity of the film, thus requiring a lower voltage to produce the same wattage output. The smaller the particles of the pigment, the greater the viscosity of the mixture of pigment and binder for equivalent weights of material. This high viscosity affects the amount of pigment that can be added, and in some circumstances, makes application more difficult and control of film thickness more difficult. Thus, the use of micron-sized crystallites does not permit as great a concentration of pigments to be incorporated. Additionally, by having a much larger total surface area, low micron-sized particles have a significantly higher particle to binder interface transitional zone, which increases resistivity.

As an example of the type of lamellar crystallite-graphite found most satisfactory, the type KS synthetic graphite produced by LONZA, Ltd., Switerland, may be cited, although other crystalline graphites can be used.

The requirements for the type and grade of the manganese dioxide are not critical. Representative manganese dioxide grades that can be employed to give satisfactory performance include commercial, technical, C.P. grades and battery grades of at least 75–79% $MnO_2$. Material from either synthetic or natural sources can be used. Battery-grade material is preferred since it is substantially free of contaminants, such as iron oxide, silicon, etc., which detract from the ability of the $MnO_2$ to function as a resistive component while yielding electrons in an electron-donor relationship. Preferably, the material will be finely ground having approximately 100–400 mesh particle size since this material is commonly employed by dry cell manufacturers, and is, therefore, generally commercially available. Diamond Shamrock Chemical Co. type "M" and Lavino Division of International Minerals and Chemical Co. Lavinore "A" have been successfully utilized.

Similarly, the requirements for the type and grade of zinc oxide are not critical. At the infra-red wavelengths emitted by these thermogenic compositions, ZnO is highly transparent; i.e. it transmits — rather than absorbs — the energy emitted. Although any grade of ZnO can be utilized while manufactured by any of the common means, optimum results are obtained by the use of photoconductive/photovoltaic grades commonly used in electrophotography, which have been heat-treated to open up their crystal lattices and permit the material to act as a semiconductor and "electron donor" under the conditions of current flow in the coating. Accordingly, these grades are preferred. An example is New Jersey Zinc Company PHOTOX '8' grade, which has a mean particle size of 0.3 microns. It should be emphasized, however, that the particle size of the ZnO used is not critical.

Although the pigment is generally incorporated into a vehicle, it can be used alone as a dry powder coating directly onto a substrate or onto an adhesive layer. It can be dusted or blown or sprayed dry, or sprayed or dusted electrostatically, or it can be suspended in water or other liquid vehicles — which are subsequently evaporated — leaving a dry layer. The pigment can be compacted by pressure and transferred to a substrate as a film or layer, or it can be compacted into a wide variety of three-dimensional shapes and forms of varying sizes.

Generally, the vehicle dictates the application for a particular conductive film formulation, and vice-versa, the application or use dictates the type of vehicle and a particular formulation required, thus controlling conditions such as concentration of pigment in the vehicle, types and ratios of ingredients, thickness or density of application, etc.

The vehicle employed in this invention is flowable under the conditions of temperature and pressure in which the coating composition is employed. The vehicle can be a fugitive vehicle; that is, after the coating composition has been applied to a substrate the vehicle can be substantially entirely removed, such as by evaporation or pyrolysis, leaving the pigment on the substrate. Thus, in its broadest sense this invention contemplates the use of organic and inorganic materials which do not dissolve the pigment components. Even air and other gases and vapors can be considered to be vehicles.

Furthermore, the vehicle can comprise a binder capable of forming a film, and optimally, a solvent for the binder. In this instance, the solvent is generally removed leaving the pigment distributed throughout the binder. The binder is then cured to form a film having the pigment dispersed therethrough.

This invention also contemplates the use of so-called "powdered lacquers" with the electrically conductive particulate blend. In this instance, the powdered lacquer is not generally considered to be part of the vehicle since powdered lacquers are frequently applied in a stream of air (the vehicle) or electrostatically. The powdered lacquer can be considered to be a binder, however, since it is capable of forming a film after being cured. Thus, this invention contemplates the use of liquid or solid binders with the electrically conductive particulate blend.

The limitations of the binder are physical, chemical, physico-chemical, electric, electronic, radiative and esthetic, as well as economic. By and large, the characteristics required encompass, but are not limited to, the following: thermal resistance, i.e. the ability to withstand exposure to the degree of heat encountered in the application for prolonged periods desired of the application, e.g. 50,000 hours at 120°F, or 10,000 hours at 550°F or 900°F without significant degradation or physical changes which would affect the behavior and functioning and safety of the coating; good adhesion to the substrate to which it will be applied, and to the conducting electrodes; good cohesion and film-forming ability under high pigment volume loading required to hold the concentration of pigment necessary for a particular application; a coefficient of thermal expansion which approximates that of the substrate so that the coating will not crack or delaminate from its substrate or applied electrodes; a low viscosity at a sufficiently high solids content to permit the incorporation of the pigment volume loading required for a particular application; a degree of film flexibility, after drying and cure, required by the application; no physical or chemical effect on the substrate to which it will be applied; ability of the film to withstand the physical and chemical and environmental stresses to which it will be subjected [e.g. vibration, shock, humidity, water, salt spray, solvents, acids, alkalies, temperature extremes, temperature cycling, sunlight (UV radiation), ozone, fungal and bacterial degradation, etc.]; capability of aging with time and use without significant changes (breakdown) in these physical and chemical properties and without migration of the incorporated pigments; non-flammability or self-extinguishing characteristics; and with an inherent volumetric resistivity sufficiently low so that the pigment can overcome this interface transitional resistance in establishing electrical continuity between the applied electrodes. All these aforementioned requirements can be fully met by this invention.

In view of these factors, it will be apparent that the proportions of the conductive particulate blend and vehicle in the coating composition of this invention, and the proportions of binder and solvent (when used), can vary over a wide range. It has been found that it is frequently easier and more practical to work with a "standard" formulation containing a fixed amount of the conductive particulate blend per volume of binder, dilute as required, and apply the necessary quantity of paint, i.e. number of grams of pigment per square inch of surface for each different type of binder system. Varying the thickness of the coating is generally easier than varying the concentration of pigment in a binder system. Preferred standard formulations are set forth hereinafter (i.e. Type I, II, III and IV illustrative formulations).

It has also been found that the lower the volume resistivity of the binder, the lower the concentration of pigment required to reach a preestablished or desired film ohmmage for a particular configuration.

While it has been found that binders with about $10^{13}$ ohms/cm or lower volume resistivities, when tested by ASTM Standard Method D-257, are preferred, binders with about $10^{15}$ or even up to about $10^{19}$ ohms/cm have been successfully utilized by increasing the concentration of pigment loading, by increasing the thickness of the conductive paint layer, by electrical circuitry changes which decrease the distance between electrodes, by electrically connecting more than one coated area in parallel, by increasing the applied voltage, and by a variety of other methods, which are known to those skilled in the art of conductive coatings. Similarly, binders with higher or lower volume resistivities can be utilized by adjusting the formulation accordingly.

In the art and practice of working with an infra-red generating coating system, all facets of the system requirements must be considered, and the properties balanced, taking into consideration all limitations of whatever nature — physical, chemical or electrical. Thus, the binder must be mated with the pigment to produce a system having the desired characteristics. For any particular application, almost any binder with physical, chemical and electrical properties suited for that system can be utilized. Since the binder is an integral part of the system and numerous types of organic and inorganic, natural and synthetic, animal, vegetable, or mineral, aqueous or solvent, thermoplastic or thermosetting, rigid or flexible binder systems can be utilized in the application of these infra-red emitting coatings, an almost limitless variety of types of coatings are possible, depending only on the end application of the product. From the available handbooks and published data, one skilled in the art can select an appropriate binder system.

The less severe the requirements to meet temperature and environmental stress factors, the greater the number of suitable binders available for use. Many thermoplastic or thermosetting resin systems can be utilized successfully if the maximum temperature demand is limited to 200°F, wherein the selection will generally be based on other factors, such as flexibility, ability to hold a candidate film under high pigment loading, ease of processing, cost, aging resistance, etc. As the temperature requirements increase, especially long-term aging without degradation at higher temperatures, the number of suitable canditate binder systems rapidly decreases. On the other hand, when a binder system with good high temperature resistance is called upon only to perform at temperatures well below its maximum capabilities, this "reserve" capability can usually be translated into or equated with higher reliability, longer life, and better aging characteristics at an exponential rate.

Those versed in the art of coatings and paints will readily be able to select, from the information given below, the large number of variations possible to meet the specific requirements for any application, or a general formula suitable for many applications.

Numerous binder systems can be employed, amongst which can be listed, by commonly accepted generic categories: acrylics, alkyds, cellulosics, epoxies, fluoroplastics, ionomers, natural rubber, nylons, phenolics, polyamides, polybutadiene, polyesters, polyimides, polypropylene, polyurethanes, silicone resins, and silicone rubber, styrene-butadiene; nitrile rubber, polysulphide rubber, vinyl-ethylene, polyvinyl acetate; silicates and polysilicates; hydraulic setting Portland cement, sodium aluminate and gypsum (plaster of Paris); glass compositions, including glass frits; ceramic and refractory compositions; and minerals, such as bentonite and the like. These organic and inorganic resins and polymers can be incorporated as solvent solutions or cast from heated melts, or they can be made into aqueous emulsions or solutions.

In most of the applications under the examples cited above and those listed below, the OHM's LAW, in its various combinations ia applicable.

It will be recognized by persons skilled in the art that the thickness of a layer of the electrically conductive, particulate blend of this invention on a substrate will vary with the application conditions and conditions of use. The thickness of the coating composition of this invention on a substrate can vary in a similar manner. When the particulate blend of this invention is used alone on a substrate, film thicknesses of about 0.5 – 1.5 mils will often be sufficient. When the coating composition of this invention is employed with a substrate, film thicknesses of about 0.5 – 10 mils can be used. It must be emphasized, however, that other film thicknesses are contemplated, and these depend upon such factors as the area of the substrate, desired operating temperatures, impressed voltage, distance between electrodes, wattage output desired, nature of the binder, pigment loadings in the coating composition, etc.

In general, electricity is converted into heat, as expressed in BTU's, with an efficiency of 100%. That is, the number of watts consumed by the emitting surface, which is a function of volts x amperes drawn, is converted into BTU's directly. The heat dissipated, expressed as BTU's per hour, is a direct correlation of the number of watts drawn × 3.413, but the efficiency of the conversion into radiant or infra-red energy is a function of the emissivity of the coating or emitting material. [Emissivity or emittance, $\epsilon$, is the ratio of the radiating power of a real surface to that of an ideal black body at the same temperature, expressed as a fraction (dimensionless number) of 1].

The pigment composition and the thermogenic coatings of this invention, radiate infra-red with an emissivity of 0.96 to 0.98. In comparison, data from Standard Tables (e.g. MARK's *Mechanical Engineering Handbook*, McGraw-Hill Book Co.) show the emissivity of surfaces of other materials commonly used for radiant heaters (wire, ribbon, sheet, or film) to be as follows: polished aluminum 0.04; oxidized aluminum 0.11; copper 0.57; oxidized copper 0.78; inconel 0.35–0.78; molybdenum filaments 0.10–0.29; nickel wire 0.10–0.19; nichrome wire 0.65–0.79 (bright) to 0.95–0.98 (oxidized); silver 0.02–0.03; sheet (tube) steel (depending on type) 0.66–0.80; tungsten wire (0.03–0.35). Thus, the formulas disclosed herein are more efficient infra-red radiators than metallic and resistive wire radiant heaters, metal tube, quartz tube, quartz bulb, or tungsten filament bulb heaters, and develop significantly higher radiant power (irradiance) impacting on receptor surfaces for equal power consumption than the resistance wire or cable type of radiant heaters. Mathematical analysis based on infra-red theory and actual experimental tests confirms that the heat producing coatings of this invention are 35 to 50% more efficient in converting electrical power consumed into surface temperature than commonly used resistive wire and cable. As shown in Example 2 hereinafter, as well as in other tests, electrical consumption of 11 to 12 watts per square foot results in a surface temperature of 110°F, while a widely used resistive cable system consumes 15 watts per square foot to reach a surface temperature of 90°F.

In addition, as previously described, this invention enables one to formulate compositions having TCR's equal to about zero over the operating temperature range.

Practical applications of the infra-red emitting, heat producing and electrical conducting compositions of this invention are numerous and varied. For specific applications, such as space radiant heating, these novel coatings show marked commercial competitive advantages over alternate methods of heating; such as, efficiency in utilizing electrical energy, low cost of materials and application; ease of installation and maintenance; safety and absence of health hazards; fast and even distribution of heat; flexibility and simplicity in design of appliances without the use of fans and blowers, and without causing dirt and dust contamination of surroundings; easily controlled temperatures; etc.

The difference in space comfort heating between convection and radiant heating may be illustrated by the following example: in a 3,000 cubic-foot room, a convection air heater of 1775 watts output will raise the air temperature only 2°F per minute, requiring thus 35 minutes to bring the space from 0°F to 70°F, whereas a 1775 watt infra-red radiant heater, utilizing the formulations disclosed herein, under similar space conditions, will create instant comfort.

Specifically, one can employ fixed installations, like large or small wall panels (made of veneer, plywood, gypsum board, asbestos-cement, reinforced polyester/fiberglass, honeycomb, particle board, bagasse, composition board, insulation board, masonite and the like); ceiling panels; under-floor convering coatings; baseboard heaters; cove and valance heaters; and similar panels and/or heaters, all of them made by coating any of the substrates portrayed above. Coatings can be applied directly on the substrates or impregnated into them, or between layers, or coated on a flexible carrier, and this, in turn, adhered to the substrate. Types of installations can further include "on-site" painting, like interior or exterior walls, ceilings, and floors, and partitions, "touch-ups", and "patchings" and similar. The coatings in these cases can be applied directly to the surfaces in already constructed structures, or by means of a backing layer adhered onto the substrates. Other examples include portable-mobile installations like portable space heaters, "picture" heaters (wherein the emitting surface is covered by a painting, decoration or photograph or similar), folding screen panels, fireplace screens or log heaters (wherein, e.g. the logs may consist of a ceramic composition which is coated with the thermogenic paint), ceiling fixture heaters, bathroom heaters, closet and piano dehumidifiers for removal and control of moisture and the like.

Generally, work in open spaces requires the use of high intensity infra-red radiation. As will be demonstrated in the examples described below, a formulation disclosed herein is capable of producing up to 40 watts per square inch (= 5,760 watts/sq. ft.). Another example shows a heater producing 10,800 watts in a 4 × 8 inches panel with 30 square feet of radiating surface (360 watts/sq. ft.). Standard data sources list the watt density in watts/sq. ft. required for comfort in various types of "outdoor" and open area situations, ranging from 120 to 140 watts per square foot for unprotected areas, 80 to 120 watts/sq. ft. for outdoor protected space, to 40 to 60 watts/sq. ft. in warehouses, mill or highbay factory buildings. These figures may be compared to the 10 to 15 watts per sq. ft. for indoor use without drafts. The relationship between heating watt density on a surface at a given incident area vs. distance from source and total wattage of source may be calculated from the physics of infra-red radiation, or may be measured directly with thermopile type radiometers, infra-red pyrometers or appropriate thermometers. Charts showing these relationships are also available in standard reference sources. By adjusting the height of mounting above, or distance from, the work area with the total wattage available from the heater, or by supplying the appropriate wattage to yield the desired watt density at the work area within the confines of the available geometry for the specific type of conditions encountered, the desired degree of comfort can be attained.

Unlike radiant space heaters which are designed to cover large areas or warm people and objects in relatively large enclosed or open spaces, personal comfort heaters are designed for small space heating or conduction heating for individuals or a few objects. They are of low wattage output. This invention can be employed in the manufacture of heaters of this type, examples of which include: radiant heaters for incubators, for human and animal use, such as hospital beds for burn patients, premature infants, and poultry, chicks, pigs, etc., and for barnstall heaters for larger animals (horses, cattle), and zoo cages; incubation cabinets for bacterial cultures; as well as conduction heaters for underfoot mats, movable or fixed; thermal or "arctic" clothing; and hot pads and heater blankets.

Other applications include sauna room heaters; hot-air heaters for hand dryers; hair dryers; cooking and restaurant appliances, such as toasters, food warmers, griddles, electric frying pans, stoves and ovens, electric hot plates, grills and rotisseries and steam table warmers.

The infra-red radiating thermogenic compositions of this invention can be used as the source of radiant heat in all types of conveyor ovens, widely used in industry for drying, curing, baking, shrink packaging, etc.

The surfaces of pipelines and storage tanks can be painted directly or wrapped with the thermogenic compositions of this invention impregnated into, or adhered to, a flexible tape or sheet carrier.

The availability of the thermogenic paints to cover large areas evenly and to produce the necessary heat density required to melt snow and ice and prevent their formation, permits the economical and practical use of the material formulations disclosed herein.

Since most of the thermogenic coatings described herein are waterproof, and, in addition, can be covered or encased in waterproof insulating topcoats, they can be immersed in water without degradation or danger of electrical leakage or shock. They thus can serve as immersion heating elements with the special advantage of low wattage density extending over a large area. They are capable of heating large bodies of water without local boiling or "hot spots", and without the need for special circulating pumps. The thermogenic coatings may be painted on the sides of the retaining walls or on the bottoms of the water vessel; or, in the form of panels, attached to the walls, or suspended in the bodies of water, or laid on the floor of the vessels. Specific applications include: swimming pool and aquarium heaters; animal watering through heaters; pond and lagoon heaters and drainage ditch heaters.

Thermogenic coating formulations mounted on rigid boards or flexible carriers, operable from either line current or battery power, or from the engine's alternator directly or through a power converter, can be used in a variety of forms to supply the required radiant heat for a particular application. This category may include under-engine or oil pan heaters, under-hood heaters, battery heaters, interior comfort heaters, and the like.

The build-up of static electricity in chemicals and plastics processing, in handling fine powders and dusts, in television receivers, in delicate electrical instruments rooms, in rugs and wall coverings, in hospital operating rooms, in paint factories, munitions plants and munitions and rocket propellant loading facilities, etc., during normal operations are very hazardous. The formulations of this invention may be employed, and indeed are preferred, instead of the anti-static coatings used presently, since they exhibit a stable ohmmage over the entire range of temperatures under which they operate. This class would therefore include anti-static coating paint, coated transfer film, coated sheeting, and coated floor tiles.

This invention will be more readily understood by reference to the accompanying specific examples and formulations which are intended as illustrations only, rather than as limiting the invention to the specific details set forth therein. All parts, proportions, percentages and ratios are by weight unless otherwise indicated.

Four specific binder types should illustrate some of the many possible infra-red generating formulations. These have been selected to show a range of surface temperatures suitable for many practical applications.

Type I. Coatings suitabe for producing 325°F surface temperature continuous application and 350°–375°F intermittent application.

Type II. Coatings suitable for producing 325°–550°F surface temperature continuous application and 600°F intermittent application.

Type III. Coatings suitable for producing 500°–600°F surface temperature continuous application and 650°F intermittent application.

Type IV. Coatings suitable for producing 800°–1,000°F surface temperature continuous application and 1,100°F intermittent application.

In general, these coating formulations consist of a two-phase system, namely (a) the "vehicle" and (b) the "pigment." The meaning of each term is set forth above.

Accordingly, a series of formulations representing Types I, II, III and IV were made up, with variations from the standard formulae known in the art of paint, coatings and ink, in order to regulate flowability, flexibility, drying time and other parameters. These modifications and the inclusion of additives, e.g., wetting agents, antifoaming agents and the like had little or no effect on the essential conductivity and hence heat-producing and infra-red radiation generating characteristics of the final cured coatings.

Generally, the pigment is first combined in dry form, then the resulting dry mixture is added to a vehicle, slowly and with constant agitation in a blender, then milled in with an appropriate roll mill or ball mill, until a smooth homogeneous composition is attained, without lumps and in which the pigment particles are well dispersed (evenly coated with the binder). Generally, as much pigment is added as can be dispersed in the vehicle without lumping or drying, and with sufficient binder to coat the particles and form a film with the desired physical properties upon drying and curing. Viscosity of the resulting paint is adjusted for the particular type of application by balancing diluent or solvents to give the desired degree of flow and drying time. The paint is highly thixotropic, because of the high concentration of pigment, which tends to settle. The paint preferably should be agitated and thoroughly redispersed prior and during application, in order to ensure a uniform distribution of pigment in the final film.

| TYPE I | |
|---|---|
| (a) Vehicle | |
| Multron R 12-A[1] | 20 parts by weight |
| E-320[2] | 32 parts by weight |
| Cellosolve acetate[3] | 12 parts by weight |
| Methylethyl ketone (MEK) | 12 parts by weight |
| Toluene | 12 parts by weight |
| Xylene | 12 parts by weight |
| Flow modifiers[4A] | |
| De-airing agents[4B] | 0 to 3 parts by weight |
| (b) Pigment | |
| Graphite[5] | 450 parts by weight |
| Manganese dioxide | 30 parts by weight |

| TYPE I | |
|---|---|
| Zinc oxide | 6 parts by weight |

(1) An aromatic/aliphatic hydroxyl terminated saturated polyester, 100% solids, supplied by MOBAY CHEMICAL CO., Pittsburgh, Pa.
(2) Methyl-ethyl ketoxime blocked adduct of aromatic and aliphatic polyisocyanates, 57% solids, supplied by MOBAY CHEMICAL CO., Pittsburgh, Pa.
(3) 2-ethoxyethylacetate, supplied by UNION CARBIDE CORP., New York, N.Y.
(4) EAB 381-2, a 10% cellulose acetate butyrate in ethylacetate from EASTMAN CHEMICAL PRODUCTS, INC., Kingsport, Tenn.
(4P) Modaflow, 5% in ethylacetate from MONSANTO CO., St. Louis, Mo.
(5) Supplied by LONZA, LTD., Switzerland as indicated previously.

(a) and (b) are mixed as described above at a ratio of approximately 2.86 lbs. of (b) for each gallon of (a) to form a particularly preferred composition for TYPE I applications.

The final standard paint representing TYPE I weighs 9.4 lbs/gallon, has a viscosity of 45 sec. at 20°C. as determined with a No. 2 Zahn cup (=1.1 poise). It contains 2.86 lbs. of the conductive pigment per gallon, equivalent to approximately 30.5% by weight of the paint; 2.02 lbs. of resins representing 21.2% by weight of the mixture; while solvents and diluents weigh 4.5 lbs/gallon or 48.3% by weight.

Due to the platiness and slip characteristics of the graphite crystallites in the pigment component, the heavy loading of pigments in the resins produces only a modest viscosity, or 110 centipoise at 20°C., thus permitting easy flowability. Prior to use, and depending on the method of application, the viscosity of the paint, its drying rate, or its flowability or sprayability characteristics can be adjusted by the addition of any of the ingredients of the solvent/diluent blend or with any other compatible solvent/diluent, such as the aromatic hydrocarbons SOLVESSO 100 or SOLVESSO 150, or their equivalent.

It will be apparent that a large number of combinations and variations are possible. Thus, many types of diisocyanates, polyisocyanates or blocked polyisocyanates can be used, with aliphatic or aromatic chains. Other saturated or unsaturated linear or branched polyesters may be substituted therefor or combined therewith, as well as polyethers and caprolactones and the like, or other hydroxyl-bearing moieties, or adipates, phthalates and the like. A wide variety of solvents and diluents can be added, as well as suspending agents, thickening agents, thixotropes, anti-foaming agents, and other additives conventional in paint formulation. Similarly, a great number of curing catalysts can be added, e.g. metallic driers, dibutyltin dilaurate, zinc octoate, tertiary amine salts of organic acids, dimethylformamide, etc. depending on the particular polyisocyanate and polyester combination selected. If practical, the catalysts should not be added until immediately before use, as they tend to reduce the pot life of the formulation. Dimethylformamide can be used up to 1% based on resin solids, while 0.05% to 0.5% is adequate for metallic driers.

The proportions of the various materials disclosed in TYPE I formulations can be varied widely, and while these modifications will affect the physical properties and resistance to environmental stresses of the binder and the paint, these modifications, with the exception of varying the concentration of the pigment mixture, have little effect on the final conductivity of the cured conductive coating. For example, the polyester component can be varied from about 8 – 40% parts by weight; the isocyanate component from about 15 – 65%, while the solvents/diluent component can be varied from about 20 – 60%.

The specific gravity of the vehicle and of the paint, as well as their weights per gallon will vary in accordance with the relative concentration of resin, solvents, and conductive pigment mix utilized. Vehicles as low as specific gravity of 0.85 weighing 7.1 lbs. to the gallon and paints weighing 11.5 to 12 lbs. to the gallon have been successfully utilized, but it will be understood that other specific gravities can be employed.

The relative concentrations of the pigment and binder are important in determining the final resistivity of the cured film, and varying these concentrations is one method of controlling the final wattage density of a heat-producing system. Pigment concentration in the paint has been varied from about 0.5 lbs. to about 6.0 lbs. per gallon. For practical and commercial purposes, it is preferable to standardize on one concentration of pigment in a formulation, hence the selection of the TYPE I formulation, which yields a good balance of properties for many applications.

TYPE I is a thermo-setting system with a temperature-time relationship for curing generally in the range of about 30 to about 60 min. at about 275°–300°F; about 30 min. at 300°F, 15 min. at 350°F, down to about 60 sec. at 500°F. These cure times depend on the thickness of the coating and the type of heat system utilized, and are related to the time required to drive off solvents and the blocking agent in the polyisocyanate component, and time for the resin cross-linkage to be completed. The curing temperature can be significantly reduced by incorporating about 0.1% to 0.5% of a suitable catalyst such as those mentioned above. However, incorporating curing catalysts tends to shorten storage stability of the uncured coating compositions.

In the TYPE I formulation, heat is used to drive off the blocking agent (methylethyl ketoxime) in the polyisocyanate to permit the reaction of the functional —NCO groups with the polyester hydroxyls. Other blocked polyisocyanates can be used in which the blocking agents (e.g. phenols) can be removed at lower temperatures or by the addition of catalysts alone. Additionally, non-blocked isocyanates can be substituted which will cross-link with the hydroxyl-bearing moieties at room temperatures into "thermo-rigid" coatings. Additionally, depending on the temperature requirements for the intended uses, thermoplatic polyurethane formulations can be substituted for the thermosetting resins disclosed herein.

In those formulations which require heating for the cross-linking (curing) of the resins and the driving off of volatile solvents, diluents, and blocking agents (if any), heating can be done in a variety of ways. The conductive films and their substrates can be placed in an oven and subjected to hot air, convection heat, or infrared radiant heat, or cured by microwave radiation; they can be placed on hot plates and cured by conductive heat; or curing can be accomplished in-situ by passing electrical power through the conductive/resistive film until the temperature builds up to the desired degree and is held there for the necessary length of time to accomplish cure.

The heat-producing films do not require full cure (cross-linking) in order to function as a heater. Curing can be stopped at any desired point which yields an overall resistance adequate for the application.

The binder combination disclosed herein as TYPE I was utilized because of its flexibility, good aging stability, and its ability to resist long-term exposures to 325°F. Substituting linear saturated polyesters in varying proportions for the branched polyester used in TYPE I increases the flexibility of the coating — the greater the proportion, the more flexible the film. Complete substitution results in a highly flexible film, but unable to withstand prolonged exposures to 325°F.

The following examples serve to illustrate the applicability of the paint formulations according to TYPE I.

EXAMPLE 1

A 4 × 8 feet veneer-surfaced plywood wall panel is painted on the rear surface. The various applications described below, each covering 29 square feet of surface, are made by hand, using a felt roller-coater.

A base primer coat of 548 grams of the resin-binder system alone is laid down to seal the wood fibers, and permitted to air dry. Two coats of conductive/resistive TYPE I paint are applied totalling 2,000 gms. of paint (=70 gms./sq. foot). The first coat is permitted to air dry prior to application of the second coat. One-inch wide aluminum foil strips, 3 mils thick, are pressed into the first coat while still tacky. The strips are placed parallel to and along the entire length of the long sides, 1.5 inches in from the edges of the panel, with sufficient length to permit later terminal connections. The second coat covered and thus embedded these electrodes. After air drying and checking for circuit continuity and film integrity, the electrodes are connected to contact terminals and external wiring. A source of power applied through a variable transformer is gradually increased from 60 volts through 135 volts and held overnight, thence 240 VAC is applied. Surface temperature reaches 325°F, and is held for 15 minutes to effect cure. The panel is coated with 300 grams of the clear resin/binder system above as the insulating protective coat.

The final overall resistance of the cured panel is 5.2 ohms. Extensive testing for over 3,000 hours shows no changes in the resistivity, physical properties of the heat-producing film, nor changes in the physical properties of the substrate. Thus, the resistance of the thermogenic formulation is stable with time. The overall ohmmage resistance is independent of the applied voltage and does not change, as determined by amperage draw and the use of Ohm's Law relationships, when the panel is subjected to varying applied voltages, ranging from 12 to 480 volts AC 60 Hz, or 12 to 60 volts DC. The overall ohmmage resistance is independent of the operating temperature and does not change at any temperature between 80°F and 325°F, i.e., the temperature coefficient of resistance of the film is zero. Because of this, the initial amperage draw, at start-up, is found to be the same as operational amperage draw, and no current surge occurs. The surface temperature of the conductive/resistive film, exposed to air, i.e. without thermal or reflective insulation, is found to be directly and arithmetically correlatable to the total wattage consumption of the system. To enable the uniform plotting of surface emission temperature vs. wattage consumption applicable to any size panel or conductive film area coverage and effective ohmmage resistance, watt density is expressed in watts per square inch of area covered by the thermogenic paint.

Ohmmage resistance of the paint is an inverse function of the distance between the electrodes (if area is held constant) and the state of cure of the binder system, as well as a direct function of the thickness of the paint coating and the concentration of the pigment. Resistances can be read directly with suitable ohmmeters, or indirectly by applying a known impressed voltage and reading the resultant amperage draw. Since, for each design, the ohmmage is fixed, the simplest method of controlling the heat output is the control of the watt density, by varying the applied voltage or the phase cycle or the time cycle of power supply. The resulting ohmmage of the paint system is convertible into watt density. The resulting surface temperature is a direct function of the watt density of the thermogenic film. Surface temperatures resulting from similar watt densities will vary according to the type of substrate on which the conductive film is applied and the amount or thickness and type of insulation backing the substrate. Until temeprature equilibrium is established with the substrate by its conductive heating, surface temperature will increase.

By use of a VARIAC transformer, the panel of Example 1 was subjected to varying voltages, resulting in varying amperage draw and varying watt densities. Surface temperatures were read using an electronic contact pyrometer. Readings were taken at various sectors of the panels and averaged.

The following Table I summarizes the results of numerous tests on free-standing uninsulated panels using Type I formulation, and lists the stabilized surface temperatures in °F, versus watt density, in watts per square inch:

TABLE I

| WATT DENSITY (watts/sq.in.) | SURFACE TEMP. (°F) | WATT DENSITY (watts/sq.in.) | SURFACE TEMP. (°F) |
| --- | --- | --- | --- |
| 0.1 | 90–95° | 1.3 | 270° |
| 0.2 | 105–110° | 1.4 | 280° |
| 0.3 | 125° | 1.6 | 300° |
| 0.4 | 135° | 1.8 | 310° |
| 0.5 | 150° | 2.0 | 320° |
| 0.6 | 165° | 2.2 | 340° |
| 0.7 | 180° | 2.4 | 355° |
| 0.8 | 200° | 2.6 | 370° |
| 0.9 | 220° | 2.8 | 380° |
| 1.0 | 235° | 3.0 | 400° |
| 1.1 | 250° | 3.2 | 415° |
| 1.2 | 260° | 3.4 | 430° |

As is readily evident from the data, there is a positive linear correlation between watt density and temperature, with excellent fit. Between 0.1 and 1.4 watts per square inch, each 0.1 watt/sq. in. raises the surface temperature approximately 14°F, and from 1.4 to 3.4 watts per sq. in., each 0.1 watt/sq. in. raises the surface temperature 7.5°F. The change in slope of the curve is explainable, in part, by an increase in the convection and conduction components of heat transfer.

EXAMPLE 2

A 2.5 × 8 feet (20 sq. ft.) veneer surface plywood wall panel is painted on the rear surface utilizing 1,300 grams of the TYPE I formulation paint, equal to 65 gms. of paint per square ft. No base primer coat was applied. Aluminum foil electrodes, 2 mils thick, 1 inch wide, are applied 28 in. apart to the panel edges running lengthwise and parallel to the edges of the board and adhered in place using the conductive paint as the adhesive. Following appropriate in situ curing by passage of electric current, a final overall resistance of 2.5 ohms is attained. The panel is maintained on 41 volts (AC) for 2,000 hours, drawing 16.5 amps without change in the physical or electrical properties of the paint or the substrate. While on the 41 VAC power load, the panel drew 677 watts or 34 watts per sq. ft., equal to 0.23 watts per sq. in. The coated surface temperature fluctuated between 118° and 120°F, which, with equilibrium established, was the same temperature on the front surface.

Two inches of aluminum coated fiberglass insulation board is clamped to the rear of the panel resulting in a surface temperature rise to 155°–160°F. Occasionally, during the test period, without the fiberglass insulation, the power level is boosted to 50 VAC, resulting in an increased amperage consumption to 20 amp. and a total wattage draw of 1,000 watts. At this 50 watts per sq. ft. or 0.35 watts/sq. in., the temperature increases to 130°F. The voltage level is decreased to 25 VAC. The panel draws 10 amps, yielding an overall 250 watts or 12.5 watts per sq. ft., or slightly less than 0.1 watts per sq. in. The surface temperature of the coating reads 90°F. When the 2 inches of fiberglass insulation is clamped onto the front surface of the panel, the temperature of the coating reaches 110°F.

EXAMPLE 3

A 2 × 4 feet fiberglass ceiling panel, 0.75 inch thick, is coated with a base primer coat of TYPE I paint without pigment to yield a smooth, impervious surface. A total of 657 gms. of conductive paint TYPE I formulation, equivalent to 82 gms/sq. ft. is applied. The aluminum electrodes are applied in the manner described in Example 1 and terminals connected. The coating is hot air oven-cured through a curing cycle which consists of air drying, followed by driving off the solvent and diluents by subjecting the panel to 180°F, and then by increasing temperatures of 240°, 300°, 350°F for 15 minutes at each stage. The cured panel shows an overall resistance of 3.1 ohms, which does not change in 2,000 hours of testing on several voltage levels controlled by a VARIAC variable transformer. The voltage levels were 34 VAC, 39 VAC and 45 VAC, resulting in amperage draws of 11.0, 12.5, and 14.5 amps, respectively. The overall wattages of 344, 488 and 652 yield 0.33, 0.42, and 0.57 watts per sq. in. and surface temperatures of 145°–150°F, 160°–165°F and 175°–180°F, respectively.

Comparison with the stabilized average surface temperatures for various watt densities listed above shows an appropriate 25% higher reading for this panel, when a 2 inches thick fiberglass insulation is applied backing the conductive paint. The insulation acts as a heat sink, first absorbing by conduction heat energy emitted by the coating and then re-radiating the heat to add to the heat being emitted by the coating.

EXAMPLE 4

A 1 foot × 2 feet × 1/16th inch thick flat smooth cement asbestos board is coated with 58 gms. of TYPE I paint formulation. No base insulating coat is used. Aluminum strip electrodes and terminals are applied as previously described in Example No. 3. The result of this 29 gms/sq. ft. of paint is an overall resistance, by direct determination, of 9 ohms, confirmed by applying 118 VAC and noting an amperage draw of 13.0 amps. The surface became hot immediately. The overall 1,534 watt output (equal to 5.3 watts/sq. in.) with a surface temperature of approximately 560°F caused a breakdown of the film, resulting in blistering, smoking, and finally ignition and destruction of the panel. By applying a lower voltage, the integrity of the panel could have been maintained.

EXAMPLE 5

A panel is prepared in accordance with Example 4. When applied to 60 VAC it draws 6.5 amps, equal to 9 ohms overall resistance, and yields 390 watts overall. At 195 watts/sq. ft. (equal to 1.35 watts/sq. in.) a surface temperature of 270°F is reached quickly, and holds steady with no damage to the paint.

EXAMPLE 6

The panel from Example 5 is provided with a second coat of 58 gms. of paint, and subsequently heated in the same manner. The overall resistance of the panel, now containing 58 gms. of paint per sq. ft., is reduced to 4.5 ohms as shown by direct measurement and confirmed by applying 60 VAC to the terminals, where the panel draws 13 amps. This results in an overall wattage of 780, or 390 watts/sq. ft., equivalent to 2.7 watts/sq. in. The surface temperature stabilized at 370°–375°F. Analysis of this data shows that as the paint concentration, i.e. the number of grams/sq. ft., is doubled, the overall resistance is halved, resulting in a doubling of the amperage draw for any given applied voltage and a doubling of the resulting wattage output. For any fixed resistance, when the voltage is doubled, the amperage doubles and the overall wattage is quadrupled.

EXAMPLE 7

A 4 feet × 8 feet × 1 inch thick fiberglass reinforced polyester surfaced honeycomb panel, manufactured by PANELCOMB Industries of Gainesville, Fla., after surface preparation to remove the gel coat layer, is coated with 1,540 gms. of TYPE I paint formulation, yielding 51 grams/sq. ft. over the 30 sq. ft. of painted area, equivalent to 29 sq. ft. of effective radiating area. After applying aluminum electrodes and terminals in the manner described in Example 1, the coating is cured in situ by activating the panel on a 240 VAC line. As curing progresses, amperage gradually increases, indicating lowering of the coating resistance. Concomitantly, surface temperature increases. Final overall resistance of the coating is 7.5 ohms, which causes the panel to draw 32 amps on 240 VAC. The resulting 7,680 watts output, equivalent to 265 watts/sq. ft., or 1.8 watts/sq. in., causes a surface temperature of 320°F.

The panel is then cut crosswise into two sections, A and B, each of which is tested separately. Section A is left with a coated area 57 inches long by 45 inches wide, or 2,565 sq. inches, equal to approximately 18 sq. ft., and represents 62% of the original coated area. Section B is left with a coated area 36 inches long by 45 inches wide, or 1,620 sq. in., equal to approximately 11 sq. ft. and represents 38% of the original coated area. When placed on 240 VAC, Section A draws 19 to 20 amps, averaging 19.6 amps, indicating an effective overall resistance of 12.2 ohms. The resulting overall wattage of 4,704 is the equivalent of approximately 262 watts per sq. ft. or 1.8 watts/sq. in. and yields a surface temperature of 310°F. Section B, when placed on 240 VAC, draws 12 to 12.5 amps, averaging 12.1 amps, indicating an effective overall resistance of 19.8 ohms. The resulting overall wattage of 2,904 is the equivalent of 264 watts/sq. ft. or 1.8 watts/sq. in., and yields a surface temperature of 310°–320°F. Analysis of the data leads to some surprising conclusions: The average quantity of paint (51 gms.) per sq. ft. was not changed when the panel was divided and the applied voltage (240 VAC) remained the same, as did the distance (45 inches) between the electrodes. The sum of the total wattage output of the parts A and B equals the total wattage output of the whole; the watt densities per sq. ft. and per sq. in., and hence the surface temperature was not changed whether the panel was whole or cut into sections; and the smaller the surface area, the higher the overall resistance.

EXAMPLE 8

A 2 feet × 4 feet × 5/8 inch mineral wool acoustical ceiling panel is painted on the rear surface with 60 gms. of the base primer coat (TYPE I formulation without pigment) to seal the surface, thence with 371 gms (=53 gms/sq. ft.) TYPE I formulation conductive coating composition. Following the longitudinal application of 1 inch wide aluminum foil electrodes 23 inches apart and terminals, the panel is cured in situ by passing 115–117 VAC current through the panel. The panel has a radiating surface area of 855 sq. in., or approximately 6.0 sq. ft. On 115 VAC it draws 17.5 amps, indicating an overall 6.5 ohms resistance. The total 2,013 watts output is equal to 336 watts/sq. ft. or 2.3 watts/sq. in. and measures a surface temperature of 335°F.

The panel is cut approximately in half crosswise, leaving 486 sq. in. (=3.4 sq. ft.) of radiant surface area. When Section A is placed on 115 VAC it draws 10.0 amps, indicating an 11.5 effective ohms overall. The resulting 1,150 overall wattage drawn from the 3.4 sq. ft. thus yields 339 watts/sq. ft. or 2.3 watts/sq. in. Temperature reading shows 335°–340°F. Because the panel was to be used as wall-mounted picture heater, it was further cut to size to fit a frame by removing another 5 inches from the length. The final panel Section A has a radiant surface area of 379 sq. in. (=2.6 sq. ft.). When tested on 115 VAC, it draws 7.8 amps, indicating an effective 14.8 ohms overall resistance and yields a total wattage of 897, equal to 345 watts/sq. ft., or 2.4 watts/sq. in. The resulting surface temperaure is 345°F.

Within the limits of measurement and arithmetical "rounding off" error, the data reinforces the previous conclusion that for any fixed paint density when the distance between the electrodes and the applied voltage are the same, the resulting wattage density and surface temperatures remain the same, and are dependent on the overall resistance of the coating, which is a function of the surface area of the panel.

EXAMPLE 9

Two 2 feet × 2 feet × 1/16th glass fiber reinforced polyester translucent panels are given identical treatments. After surface cleaning with toluene, they are roller-coated directly with the TYPE I paint, and aluminum electrodes applied. Air dried only, prior to heat cure, they both show the same overall resistance of 105 ohms, determined by direct multimeter instrument reading.

Connecting the electrode extensions, that is, placing the two panels in parallel, in effect doubling the surface area from 4 to 8 sq. ft. with the same elecrode distance spacing, halves the overall resistance to 53 ohms.

Data obtained from other tests indicate that if a third similar panel had been added and similarly connected in parallel to give a total of 12 sq. ft. of surface area, the overall resistance would have been cut to one-third, or 35 ohms overall. Thus, the general electrical enginerring equation for resistors in parallel:

$$R_{total} = \frac{R_1 R_2 R_3}{R_1R_2+R_2R_3+R_3R_1}$$

holds true for these conductive coatings. As is evident from other data presented herein, the watt density in either watts/sq. ft. or per sq. in., and thus the surface temperature, is inversely correlated with this total overall resistance of panels connected in parallel or total surface area.

EXAMPLE 10

A series of three 2 feet × 4 feet × 3/4 inch thick mineral fiber acoustical ceiling panels are coated with TYPE I paint and cured in situ as previously described. On 110 VAC, they each draw 12.5 amps, thus yielding 1,375 watts overall, or 229 watts/sq. ft., (=1.6 watts/sq. in.). Surface temperatures range around 300°F, varying from 290°–315°F.

Because the conductive paint imparts a dead black on the surfaces, the panels are coated respectively with: (a) a commercial high-temperature white epoxy paint; (b) a commercial flat light green silicone-alkyd resin paint; (c) a canvas-based patterned tan colored vinyl wallcovering using the pigment-free clear insulating topcoat binder of TYPE I as the adhesive. In each case the surface coating effectively masked the black, without lowering the surface temperatures of the panels.

EXAMPLE 11

The surface temperatures associated with wattage densities noted in the previous examples are equilibrium temperatures recorded on free-standing panels, open to still air, and uninsulated except for the insulation afforded by the substrates on which the conductive films were painted.

A series of five tests on 2 × 4 feet mineral wool acoustical ceiling panels and fiberglass reinforced polyester panels demonstrates that the surface temperatures, and hence radiating microwave power, are considerably enhanced when insulating fiberglass is used as insulating material behind the substrate, and further enhanced when aluminum foil is employed as a reflector either in front of or behind the insulation, or adhered to the substrate itself. All tests are run by establishing a predetermined watt density designed to yield the desired free-standing uninsulated surface temperature, viz. 110°F, 120°F, 130°F, 140°F and 150°F. In accordance with the established ohmmage rating of the panel, a VARIAC variable transformer is set to govern the applied voltage and amperage draw necessary to yield the selected watt density.

It was noted throughout these tests that once the proper watt density is fixed, it does not vary at any time or temperature. That is, the ohm resistance of the panels remains constant as did the voltage, hence the amperage does not vary. The ambient air temperature of the laboratory during the testing is maintained at approximately 60°F.

In all cases, the surface temperature of the panels increases over the experimental base line temperatures gradually, and depending on the thickness of the backing insulation, peaks, forms a plateau, and thereafter remains constant until the end of the testing. Peak temperatures are attained in from 30 to 120 minutes depending on the thickness of the insulation applied. The front of the panels, the rear interface of the panels with the first layer of insulation, the surfaces between each layer of insulation, and the rear surface to the insulation are all instrumented with thermocouples connected to a millivolt pyrometer. Only the data from surface temperature readings are presented in the following Table II. The insulation used in the tests was JOHNS-MANVILLE fiberglass board, aluminum-faced, 2 feet × 4 feet × 1 inch thick, the same size as the coated panels:

TABLE II

|  | TEST No. 1 | TEST No. 2 | TEST No. 3 | TEST No. 4 | TEST No. 5 |
|---|---|---|---|---|---|
| Volts applied | 35 | 42 | 47 | 53 | 53 |
| Amps drawn | 5.5 | 6.0 | 7.3 | 7.5 | 8.0 |
| Wattage | 192 | 252 | 343 | 398 | 424 |
| Watts/sq. in. | 0.22 | 0.30 | 0.40 | 0.47 | 0.50 |
| Baseline Surface Temperature | 110°F | 130°F | 130°F | 145°F | 150°F |
| Layers of 1" insulation | 2 | 2 | 2 | 2 | 3 |
| Max, Surface Temperature | 155°F | 160°F | 170°F | 185°F | 208°F |

When one 1 inch fiberglass insulation layer is laid on top of a panel, i.e. applied against the coated surface, in addition to the rear insulation, surface temperatures quickly rise to over 400°F and 450°F, and because these temperatures exceed the heat resistance of the TYPE I coatings, the front surface insulation tests are terminated.

Thus, by utilizing 2 inches of fiberglass insulation on the rear of the substrate, surface temperature, i.e. infrared radiation "pressure" is increased by 25 to 35% without any additional consumption of electrical power.

| TYPE II | |
|---|---|
| (a) Vehicle | |
| AI-537[1] | 100 grams |
| Dimethylformamide (DMF) | 50 cc. |

[1]A polyimide-polyamide homopolymer based on trimellitic anhydride (TMA) supplied by AMOCO CHEMICALS CORP., Chicago, Ill. As supplied, it contains 25% solid resins in a solvent blend consisting of 75% of N-methyl pyrrolidone + 25% aromatic hydrocarbons, and is a viscous amber-colored solution, weighing 9 lbs/gallon.

This composition can be used as a base primer and as an insulating topcoat, as well as the vehicle of the conductive paint.

| (b) Pigment | |
|---|---|
| Same as outlined under TYPE I (b). | 50 grams |

The phases (a) and (b) are now mixed, as described before to form a particularly preferred composition for TYPE II applications.

The resin solution can be cut back to a lower viscosity by adding a compatible solvent, e.g. dimethylformamide, aromatic hydrocarbons, cyclohexanone, and the like. The resin should be completely cured first by air drying, followed by air oven drying at about 200°–220°F for about 15 minutes; about 350°F for about 15 minutes, and about 500°F for about 15 mintes. Cure cycle and method can be varied for any particular application.

EXAMPLE 12

This example illustrates further the applicability of the instant invention at higher temperatures, while following the teachings relative to TYPE I formulations.

A 1 foot × 2 feet × ¼ inch special asbestos-cement[2] panel rated to withstand 662°F (350°C) is coated with 100 grams of TYPE II conductive paint, equal to 50 gms/sq. ft. After application of aluminum foil electroces, 2 mils thick and 22 inches apart, and terminals and appropriate curing, the panel attains a 46 ohm resistance. When 240 VAC is passed through the coating, the panel draws 5.2 amps. The resulting 1,250 watt output is equal to 625 watts/sq. ft., or 4.3 watts/sq. in. The surface temperatures quickly reaches 510°–530°F, and holds steady for an initial 4 hour period, following which the panel is given an insulating topcoat of 22.5 grams of clear resin. Subsequent checking over a 1 year period shows no change in resistance with time.

[2] Available under the trade name SINDANYO, manufactured by TAC CONSTRUCTION MATERIALS LTD. of Wigan, England, and available in the U.S.A. from BIPEL INTERNATIONAL, Trumbull, Connecticut 06611.

| TYPE III | |
|---|---|
| (a) Vehicle | |
| Dow Corning 805[1] silicone resin | 100 grams |
| Xylene | 120 grams |

[1]Available as DOW CORNING 805 from DOW CORNING CORP., MIDLAND, Mich. 48640. UNION CARBIDE CORP. R-603, and GENERAL ELECTRIC SR-125 silicone resins are equivalent. The resin solution is a thin, mobile, colorless liquid containing 60% resin solids dissolved in Xylene, with a specific gravity of 1.01, weighing 8.04 lbs. to the gallon.

This composition can be used as the vehicle for conductive paint, as well as a base primer and insulating top coat.

| (b) Pigment | |
|---|---|
| Same as described under TYPE I (b). | 100 grams |

The phases (a) and (b) are mixed as described before.
The resin solution can be further diluted with aromatic hydrocarbons and the like.

EXAMPLE 13

This example again serves to illustrate in detail the applicability of this invention through the use of the formulation described as TYPE III.

A 12 inches × 12 inches × ¼ inch (=1 sq. ft.) SINDANYO asbestos-cement panel is coated with 13.6 grams of TYPE III formulation, using an airless sprayer.

Following application of ½ inch-wide aluminum electrodes 11 inches apart between centers and terminals, the panel is air dried and oven cured at 500°F for 1 hour. The overall resistance is 19 ohms on 115 VAC, the panel draws 6.0 amps, and thus emits 690 watts/sq. ft. This is equivalent to 4.8 watts/sq. in. The surface temperature of the panel reads 550°–565°F, and there is no change with time through 200 hours of testing.

| TYPE IV | |
|---|---|
| (a) Vehicle | |
| "N" Brand sodium silicate[1] | 100 grams |
| Water | 50 cc. |
| (b) Pigment | |
| same as described under TYPE I (b). | 50 grams |

[1]Available from PHILADELPHIA QUARTZ CO., Philadelphia, Pa. 19106 as "N" Brand Na-silicate. This material has a $SiO_2:Na_2O$ weight ratio of 3.22, a 41° Baume, and a viscosity of 180 centipoise. It contains 38.5% solids and weighs 11.6 lbs. per gallon. It is a colorless syrupy liquid. Similar materials are available from DIAMOND ALKALI CO., Cleveland, Ohio 44115, as well as from six other major U.S.A. chemical companies.

The phases (a) and (b) are mixed as described before.

The sodium silicate solution can be used as both the base primer and insulating topcoat, as well as the vehicle for the conductive paint. It should be noted, however, that diluted as well as undiluted silicate can be used as a primer. The sodium silicate can be used along as the only silicate, or blended with potassium or lithium silicates, as well as with ethyl or other organic silicates to add flexibility to the coatings.

EXAMPLE 14

This example again illustrates the use of this invention by utilizing the binder TYPE IV to produce temperatures in the range of 900°F.

A 12 inches ×12 inches × ¼ inch JOHNS-MANVILLE asbestos millboard is coated with 30 grams of TYPE IV vehicle as a base primer, and thence with 50 grams of TYPE IV formulation in two layers. Copper foil electrodes, 0.5 inch wide and 2 mils thick, and terminals are applied in the manner described in Example 13 between the conductive coating layers. After air drying the panel is cured in a hot air oven by gradually increasing the temperature, first through a 180°–220°F range, thence to 450°F for 10 minutes. The coating is covered with a saturated solution of calcium chloride to insolubilize the silicate film. After drying, excess powder is removed by brushing. On direct ohmmeter measurement the cured panel reads 10.5 ohms. Using a VARIAC variable transformer, voltage is gradually increased to full line voltage of 115 VAC. The panel draws 11 amps, indicating an overall 1,265 watts per sq. ft. output, equivalent to 9 watts per sq. in. Surface temperature of the reddish glowing coating measures approximately 880°F when read with a WILLIAM WAHL CORP. "Heat Spy" infra-red pyrometer. Subsequent tests replicated these data.

The complete heat and infra-red producing system described herein consists of a series of intimately interconnected components whose function is to receive electrical power (either AC or DC), conduct that power from the inlet or source, convert the power into electromagnetic energy or waves towards or onto or into a receptor surface or material which will be heated thereby; control the wavelength and intensity and quantity of said electromagnetic radiation to control the amount of heat absorbed by, onto or in the receptor surfaces, air or fluid or material, thus cntrolling the temperature rise of the receptor as well as the surface temperature of the radiating surface and its substrate, all of which is performed with adequate regard to all aspects of safety. For some applications, one or more of the components of the system may be eliminated or combined with other components, or the functions themselves may be eliminated or combined as suited for a particular application. (This disclosure discusses additional novel applications for the conductive/resistive coatings which do not primarily depend on the radiating electromagnetic energy, but rather on simple electrical conduction of the formulations, hence components of the "typical" system are appropriately modified).

Each of the components of the system are, in themselves, composed of a series of or combination of elements; and in addition, the components have interfaces with each other. The system components may be classified as: (1) supportive; (2) protective; (3) conductive; (4) energizing (power); (5) controlling.

1. Supportive component

The supportive component is the substrate on which the conductive composition is mounted or supported. This may be of any type, any size, or any structure appropriate for the application; or there may be no supportive structure or substrate and the conductive composition may be "free-standing." The substrate may be solid or liquid, it may be rigid, flexible, semi-flexible or deformative; it may be metallic, non-metallic, or intermetallic; crystalline, vitreous, plastic, amorphic, powdery or composite; organic or inorganic. The following list of type of substrates is intended to be illustrative only, and not limiting. The compositions of this invention can be applied to numerous types of substrates, viz. wood and wood products, e.g. solid wood board, hard and soft fiberboard, plywood, resin-impregnated particle board; glass, e.g., woven and matted glass fabrics, fiberglass and mineral wool panels; metal, e.g. steel, aluminum, copper and brass alloys, titanium and molybdenum sheets, etc.; flexible and rigid plastic sheets of many types, e.g. polyesters, nylon, polypropyene—a variety of elastomeric sheeting—natural and synthetic rubber, sulfide and polyurethane rrubber; fiber-reinfocrced polyester, phenolics, ABS, PVC, PE, HDPE, etc.; gypsum board; paper and paper-based sheetings; asphalt; natural fiber, woven and non-woven sheetings, fabrics and felts, e.g. cotton, wood, rattan, linen, etc.; cork; mineral substrates, e.g. asbestos, concrete, plaster, cement/asbestos, mica, calcium silicates, etc.; ceramics of various types; composite plastic laminates of various types; and plastic, ceramic and glass foam structures.

In general, the type of the substrate does not influence the performance characteristics of the conductive/resistive coatings, and the selection of the substrate depends on the particular application, the environmental stresses to which it will be subjected, cosmetic and esthetic requirements and cost, amongst other technico-economic considerations. Where the substrate is an electrical conductor itself, it must be electrically isolated from the conductive/resistive coating, generally by the application of the high dielectric and electrically insulative base or primer coating.

2. Protective components a. Base or Primer Coat

As is readily apparent from the disclosure of the technology of this invention, the evenness of the coating over the whole surface area, as well as its thickness, is of importance. Uneven thickness results in uneven surface heating, called hot spots, which may lead to breakdown of the binder. Porous or semi-porous substrates, such as wood, particle-board, gypsum board, paper, fabrics, etc., absorb the solvent and the conductive paint formulation unevenly in different areas of their surface, resulting in an uneven coating. Where conductive paint is absorbed into a substrate, charring of the substrate may result. In addition, if the substrate on which the coating is applied is in itself aa conductor such as a metal, the conductive coating will electrically arc into the substrate preferentially and cause pinholes. The high temperature of the arcs leads to complete destruction of the coating. Thus, it is apparent that there will be circumstances in which it is advisable to first coat the substrate with a high dielectric, non-conductive, base or primer coat. This base coat, in many applications, can be used as the adhesive for cementing the elctrodes to the substrate. As noted above, the vehicle itself, without the conductive pigment, frequently forms a satisfactory primer coat. This has a further advantage of being compatible with the conductive formulation, so that their coefficients of expansion are similar and the two layers will not have a tendency to delaminate. However, any compatible non-conductive primer may be used as long as it results in a smooth non-aadsorptive surface.

b. Insulating or "top" Coat

As is readily apparent from the nature of conductive coatings, these are, in essence, when conducting electricity, "hot" or "live-wires," and for safety should be insulated from tough or contact with other conducting surfaces. This insulation is readily done by applying a non-conductive, high dielectric coating on the top of the conducting layer. In essence, the conducting paint layer is sandwiched between the substrae or primer layer and the topcoat layer, as are the conducting electrodes. Generally, the vehicle itself, without the conductive pigment, forms a satisfactory top or insulating coat. This has the further advantage of being compatible with the conductive formulation, so that their coefficient of expansion is similar and the layers will not have a tendency to delaminate. However, any compatible non-conductive coating can be used, such as decorative paints, plastic sheeting, paper or fabric, wood, etc.

3. Conductive Compponent

These are the heat generating, infra-red producing and electrically conductive compositions which are the object of this invention. Coating containing these compositions can be flexible, semi-flexible or rigid, as desired; they may be thin or thick. The composition can be in the form of a film, a pattern, or a slab or block; they may be flat or curved, and of any size compatible with the power sources available. As an electrically conductive component, they behave in accordance with the well known Ohm's Law. As an infra-red generating and heating source, they follow the well known Stefan-Boltzman law, Wien's Displacement law, and Planck's Equation.

4. Energizing or Power Component:

These consist of three sub-units:
  a. conductive electrodes
  b. electricl terminals and insulation
  c. external wiring to the power source
a. Conductive electrodes The conductive coating is capable of transmitting the impressed electric current over its surface without embedded electrodes, hence the use of such electrodes is optional. However, the use of electrodes does add to the efficiency of the system, reduces any tendency to arcing or channelling, or to the development of localized hot spots and reduces temperature buildup at the electrical terminals.

The surface area over the electrodes does not get hot and stays cool except as these areas are warmed by lateral conduction from the heat radiating areas. Because conductive paint is utilized in coating the substrate under and over the electrode contact areas, this quantity of material is calculated in arriving at the average amount of paint consumed per square foot. For purposes of correlating watt densities produced with quantity of paint applied, the area covered by the electrodes is deducted from the total surface area covered by the conductive paint.

The conductive electrodes, generally of a conductive metal such as copper, aluminum, copper-clad aluminum, silver-plated copper, tantalum, etc., in the form of wire or foil, have a much greater conductivity than the conductive/resistive coating. Hence, when they are connected to a power source, they preferentially conduct the current. In the examples herein described, aluminum foil 1, 2, and 3 mils thick, ¼ to 1 ½ inches wide, of an aluminum alloy No. 1235, of soft hardness, O temper was generally utilized. Aluminum is generally considered to have approximately 60% of the conductivity of copper, and this latter material can be utilized where a lower voltage drop is required.

When a pair of such electrodes are embedded in or are in intimate contact with the conductive coating, the voltage potential between the pair of electrodes causes the electrical current to pass directly between them in a straight line, following the paths of least resistance, perpendicular to the direction of the electrodes.

Depending upon the circuitry chosen for the application, electrode geometry may be varied. Two electrodes or more can be utilized; a third (common) electrode can be utilized, and electrical connections can be made in series or in parallel or any combination thereof.

The electrodes can be rigid or flexible, and of any suitable width and thickness. They normally run the length of width of the coated area at opposite ends.

In the systems described herein, there is a voltage drop between the electrodes, directly proportional to the distance between them, i.e. at a point halfway between the electrodes, the voltage is 50% of that impressed on the electrodes by the source. There is no voltage and hence no current in the area outside that bounded by the electrodes and encompassed by the electrodes. The voltage drop in the electrodes with length, caused by its internal resistance expressed in ohms per linear foot, is typical of the material used. The data is readily available in standard electrical engineering handbooks.

Due to the voltage drop between the electrodes, the standard formula for Ohm's Law requires a modification when expressing the per square foot wattage output of the conductive coating. The wattage output per sq. ft. is reduced by the square of the distance between the electrodes and becomes:

$W_d$ = wattage density per sq. ft.

$$Wd = \frac{E^2}{L^2 xr}$$ Where
E = applied voltage
L = dist. between electrodes in ft.
r = resistance of coating in ohms/square The electrodes can be attached directly to the substrate or the base or primer insulating coating, in which case non-conductive adhesives can be used and covered with the conductive coating to make the necessary contact. They can also be mounted on or attached onto the surface of the conductive coating using either that coating itself as the adhesive, or they can be attached by means of any of a number of types of conductive adhesives. The electrodes can also be sandwiched between multiple layers of the conductive coating.

b. Electrical Terminals

The electrodes, be they a pair or multiple, require connection to the power source, such connection being made by means of electrical termnals.

There are a multiplicity of types of standard and special terminals and connectors commercially available, or improvised or "custom-made" units may be utilized. In some applications simple crimping, or stud or post or bolt and nut can be used; or ring, hook, or spade ferruled or flat or serrated-leaf terminals may be more appropriate. Where the electrodes are flat or foil, one type found to be particularly preferred is sold under the trade name TERMI-FOIL by AMP, Inc., of Harrisburg, Pa.

Insulated terminals can also be employed, and can be affixed to the substrate or may be "free-standing"; they may be on the surface, or may be buried within the substrate.

c. External Wiring

The wiring leading to the terminals can be of any of a variety of types, sizes and shaped appropriate to the particular application and conforming to the applicable codes.

5. Controlling Component

The controlling component consists of those accessories whose function is to limit or control the electrical power supplied to the system, the wattage density received by and radiated or convected from the conductive coatings, and thus, the surface temperature of these coatings; and, where desired, to monitor the condition of the coatings, warn of malfunction, and take necessary corrective action in turning off or decreasing or increasing the power supply. The controlling components of the system can be classified as:

a. voltage controllers (transformers)
b. timers (infinite switches)
c. wave form modifiers (solid state switches)
d. rheostats
e. thermostats
f. power control circuits These components and their interconnection are well known to persons skilled in the art.

The practice of this invention is accompanied by a number of significant advantages. First of all, the compositions of this invention are electrically conductive, rendering them especially useful as thermogenic mateials. In addition, the compositions of this invention radiate infrared energy. When used in heating devices, the compositions are reliable in day-to-day operations becaause they exhibit temperature coefficients of resistivity equal to about zero. Additionally, their radiation efficiency is outstanding since they exhibit emissivities close to that of a black body. The compositions of this invention are lower in cost than conductive compositions contaianing precious metals. They are usable at both high and low voltages, thus elminating costly transformers in some applications. This invention provides a more efficient, less costly means for converting electrical energy into thermoenergy, and demonstrates significant (33 to over 50%) savings in electrical consumption when compared to the commonly used resistive wire and heating cable heating systems.

Thus, the data compiled herein demonstrate that compositions can be provided which are electrically conductive, usable to produce radiant heating, and easily installed and controlled. It should be understood, however, that various other modifications will become apparent to and can be readily understood by those skilled in the art, without departing from the scope and spirit of this invention. Accordingly, it is not intended that the scope of the claims appended hereto be limited to the description set forth herin, but rather that the claims be construed as encompassing all the features of patentable novelty, which reside in the present invention including all features which would be treated as equivalents thereof by those skilled in the art to which this invention pertains.

What is claimed is:

1. An electrically conductive composition comprising a particulate, homogeneous blend of:
   A. about 60 to about 98% by weight of graphite,
   B. about 1.5 to about 20% by weight of manganese dioxide, and
   C. about 0.5 to about 20% by weight of zinc oxide, each of said percentages based on the total weight of said blend.

2. an electrically conductive composition according to claim 1 wherein the amount of (A) is about 92.6%, (B) about 6.2% and (C) about 1.2% by weight.

3. An electrically conductive composition according to claim 1 wherein (A) consists of crystallites having a particle size of from about 250 microns to about 1 micron.

4. An electrically conductive composition according to claim 2 wherein (A) consists of crystallites having a particle size of from about 75 microns to about 2 microns.

5. An electrically conductive composition according to claim 1 wherein (A) consists of about 69.4% ccrystallites having a particle size of about 75 microns and about 23.2% crystallites having a particle size of about 2 microns.

6. An electrically conductive composition according to claim 2 wherein about 0.05 to about 5% by weight AgCl, based on total weight of particulate material, is added.

7. An electrically conductive composition according to claim 2 wherein about 0.05 to about 5% by weight $SnCl_4$, based on total weight of particulate material, is added.

8. A coating composition comprising the electrically conductive composition of claim 1 uniformly dispersed in an organic or inorganic vehicle which does not dissolve said particulate material.

9. A coating composition according to claim 8 in which the vehicle is comprised of a binder or binder and a solvent for the binder.

10. A coating compostion according to claim 9 wherein the binder is a member selected from the group consisting of: acrylics, alkyds, cellulosics, epoxies, fluoroplastics, ionomers, nylons, phenolics, polymades, polyimides, polybutadienes, polyesters, polypropylenes, polyurethanes, silicones, natural resins and rubbers, stryrene-butadienes, nitrile rubbers, polysulfied rubbers, polyvinyl acetate, polyvinyl alcohols, silicates, polysilicates, hydraulic-setting Portland cements, sodium aluminates, gypsum, glass and glass frit compositions; ceramic and refractory compositions; and minerals including bentonites and mixtures thereof.

11. A coating composition comprising the electrically conductive composition of claim 1 and a solid, particulate binder.

12. A coating composition comprising the electrically conductive composition of claim 1 uniformly dispersed in a vehicle comprising a binder capable of forming a film, wherein said vehicle does not dissolve said particulate material, said binder being a silicone resin.

* * * * *